United States Patent
Tsutsui et al.

(10) Patent No.: US 7,211,913 B2
(45) Date of Patent: May 1, 2007

(54) MOTOR COOLING SYSTEM (75) Inventors: Takahiro Tsutsui, Saitama (JP); Takaaki Nagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 11/093,911

(22) Filed: Mar. 30, 2005

(65) Prior Publication Data
US 2005/0285457 A1 Dec. 29, 2005

(30) Foreign Application Priority Data
Jun. 23, 2004 (JP) ............................. 2004-185452

(51) Int. Cl.
*H02K 9/19* (2006.01)
*H02K 9/00* (2006.01)

(52) U.S. Cl. .......................... 310/54; 310/52
(58) Field of Classification Search ................... 310/54
See application file for complete search history.

(56) References Cited

U.S. PATENT DOCUMENTS 3,629,627 A * 12/1971 Dafler et al. ................... 310/44
5,217,085 A * 6/1993 Barrie et al. ............. 184/104.1
5,698,912 A * 12/1997 Rasch et al. .................. 310/52
6,914,354 B2 * 7/2005 Seniawski et al. ............ 310/58

FOREIGN PATENT DOCUMENTS

| DE | 19824202 C1 | * | 9/1990 |
| JP | 10-080085 | | 3/1998 |
| JP | 11-206063 | | 7/1999 |
| JP | 11318055 A | * | 11/1999 |

* cited by examiner

Primary Examiner—Burton Mullins
(74) Attorney, Agent, or Firm—Fish & Richardson P.C.

(57) ABSTRACT

The motor cooling system of the present invention is a system for cooling a three-phase alternating current motor mounted on a vehicle as a traction motor where oil is introduced as cooling oil from driving-related equipment of the vehicle, wherein the traction motor is equipped with a stator having a neutral point, wherein the vehicle is in a high-load driving state when a larger load is applied to the traction motor than a predetermined amount, the neutral point contacts the cooling oil with a larger contact amount than when the vehicle is not in the high-load driving state.

4 Claims, 12 Drawing Sheets

MOTOR COOLING SYSTEM

BACKGROUND OF THE INVENTION

1. Field of the Invention

The present invention relates to a motor cooling system used as a traction power source of a hybrid vehicle and the like, and to a technology for effectively cooling a neutral point.

2. Description of the Related Art

A hybrid vehicle mounts an engine (internal combustion engine) and a traction motor as a traction power source and appropriately uses both or one of these, thereby realizing a highly efficient driving. For example, using exclusively the engine in cruising on a highway and the like, and both of the engine and the traction motor in an acceleration drive and a hill climb drive, a good fuel consumption and a high driving performance are realized. As a traction motor of the hybrid vehicle, a three-phase alternating current motor of a star-connection having a neutral point is generally used because of its high efficiency and control easiness. In this kind of a three-phase alternating current motor, because the neutral point bundles a wiring of each phase and is formed with being caulked by a harness, an electric resistance at the neutral point becomes larger, compared to other portions, and a density of strands becomes higher. Therefore, if high-load driving such as an acceleration drive and a hill climb drive is performed in a hybrid vehicle, heat radiation is not smoothly performed in spite of a large amount of heat generated accompanying an increased load at the neutral point (that is, an increase of a consumption current) because of the high density of the strands, and a temperature rises until near an allowable limit in a comparatively short period of time. In this case a controller of the hybrid vehicle is designed to drive by an engine only, for example, regulating a power output of the traction motor, in order to suppress the temperature rise of the neutral point.

In the three-phase alternating current motor a structure is desirable that can suppress the temperature rise of the neutral point in order to prevent the hybrid vehicle from resulting in regulating a power output thereof, shortening its life, and the like. As a technology for suppressing the temperature the neutral point is proposed one that: a plurality of neutral points are provided in a three-phase alternating current motor; the neutral points are connected by a crossover having a diameter not less than a wire diameter of a winding wire of each phase; and thereby a heat concentration on the neutral points is suppressed (for example, see paragraph 0007 and FIG. 2 of Japanese Patent Laid-Open Publication Hei. 10-80085). On the other hand, in a three-phase alternating current motor for a hybrid vehicle is proposed a technology that: a gap is provided between an armature core and a cover; a hydraulic oil of a clutch, which configures a power force output device together with the three-phase alternating current motor, is introduced into the gap; the hydraulic oil is supplied to coil end of a stator, and thereby cooling the motor is performed (for example, see paragraph 0082 and FIG. 9 of Japanese Patent Laid-Open Publication Hei. 11-206063).

However, in the three-phase alternating current motor of the Japanese Patent Laid-Open Publication Hei. 10-80085, because a manufacturing and the like of the winding wires and the crossover are difficult and a number of components also becomes many, manufacturing cost thereof increases and it is also difficult to ensure a reliability thereof. In addition, even if adopting such the structure, it is actually difficult to obtain a sufficient heat resistance and radiation.

On the other hand, in the three-phase alternating current motor of the Japanese Patent Laid-Open Publication Hei. 11-206063, when hydraulic oil introduced is low in temperature, the neutral points can be effectively cooled; when hydraulic oil introduced becomes high in temperature, on the contrary the temperature thereof is made to rise in some case. For example, although when a hybrid vehicle cruises on a highway and the like, a load of the traction motor is comparatively small and a heat generation amount of the neutral points is a few, a power transmission mechanism such as a clutch and a transmission become very high in the temperature of the hydraulic oil by a friction heat increase, which accompanies a rise of a driving speed. Therefore, if the hydraulic oil of the high temperature is supplied to the traction motor, the temperature of the neutral points results in rising on the contrary.

Consequently, a motor cooling system is strongly requested that effectively cools a neutral point of a traction motor mounted on a hybrid vehicle and the like.

SUMMARY OF THE INVENTION

In order to solve the problems described above, a motor cooling system of a first aspect of the present invention is a system for cooling a three-phase alternating current motor mounted on a vehicle as a traction motor where oil is introduced as cooling oil from driving-related equipment of the vehicle, wherein the traction motor comprises a stator having a neutral point, wherein the vehicle is in a high-load driving state when a larger load is applied to the traction motor than a predetermined amount, the neutral point contacts the cooling oil with a larger contact amount than when the vehicle is not the high-load driving state.

In the invention of the first aspect, for example, by the cooling oil is cooled the neutral point of which temperature becomes highest in the high-load driving state when a larger load is applied to the traction motor.

In addition, in the motor cooling system of the first aspect of the present, invention a motor cooling system of a second aspect of the invention reserves the cooling oil, comprises an oil puddle of which oil level changes from a normal oil level to a high-load oil level when the vehicle transits from a driving state of not a high-load driving state to the high-load driving state, wherein at least a part of the neutral point is positioned between the normal oil level and the high-load oil level.

In the invention of the second aspect, for example, if the neutral point is designed to be placed directly above the normal oil level at a rear portion of the oil puddle, the cooling oil moves according to an inertia thereof in an acceleration drive and to a rear tilt of the vehicle in a hill-climbing drive, thereby the oil level of the cooling oil changes from the normal oil level to the high-load oil level, and thus the neutral point is immersed in the oil puddle.

In addition, in the motor cooling system of the first aspect of the present invention, a motor cooling system of a third aspect of the invention comprises an oil supply mechanism for supplying oil from the driving-related equipment to the neutral point, a high-load detection mechanism for detecting whether or not the vehicle is in a high-load driving state, and an oil supply amount control mechanism for increasing an oil supply amount to the neutral point by the oil supply mechanism when the vehicle is detected to be in the high-load driving state by the high-load detection mechanism.

In the third aspect of the invention, for example, the oil supply amount control mechanism injects oil sent by pressure from the driving-related equipment through an oil supply pipe or an injection nozzle when the vehicle becomes the high-load driving state, and shuts off the pipe passage of the oil supply pipe by a solenoid shut-off valve and the like when the vehicle is not in the high-load driving state.

In addition, in the motor cooling system of the third aspect of the present invention, the high-load detection mechanism of a motor cooling system of a fourth aspect of the invention detects that the vehicle is in a high-load driving state when an acceleration of the vehicle becomes not less than a predetermined value in a driving state.

In addition, in the motor cooling system of the third aspect of the present invention, the high-load detection mechanism of a motor cooling system of a fifth aspect of the invention detects that the vehicle is in a high-load driving state when the vehicle tilts rearward by not less than a predetermined angle in a driving state.

In addition, in the motor cooling system of the third aspect of the present invention, the high-load detection mechanism of a motor cooling system of a sixth aspect of the invention detects that the vehicle is in a high-load driving state when the traction motor becomes not less than a predetermined temperature in a driving state.

DESCRIPTION OF THE PREFERRED EMBODIMENTS

Here will be in detail described some embodiments where a motor cooling system of the present invention is applied to a cooling of a traction motor of a hybrid vehicle, referring to drawings.

First Embodiment

<Configuration of Hybrid Vehicle>

Firstly will be described a configuration of a hybrid vehicle where a traction motor of a first embodiment is mounted.

Figure 1:
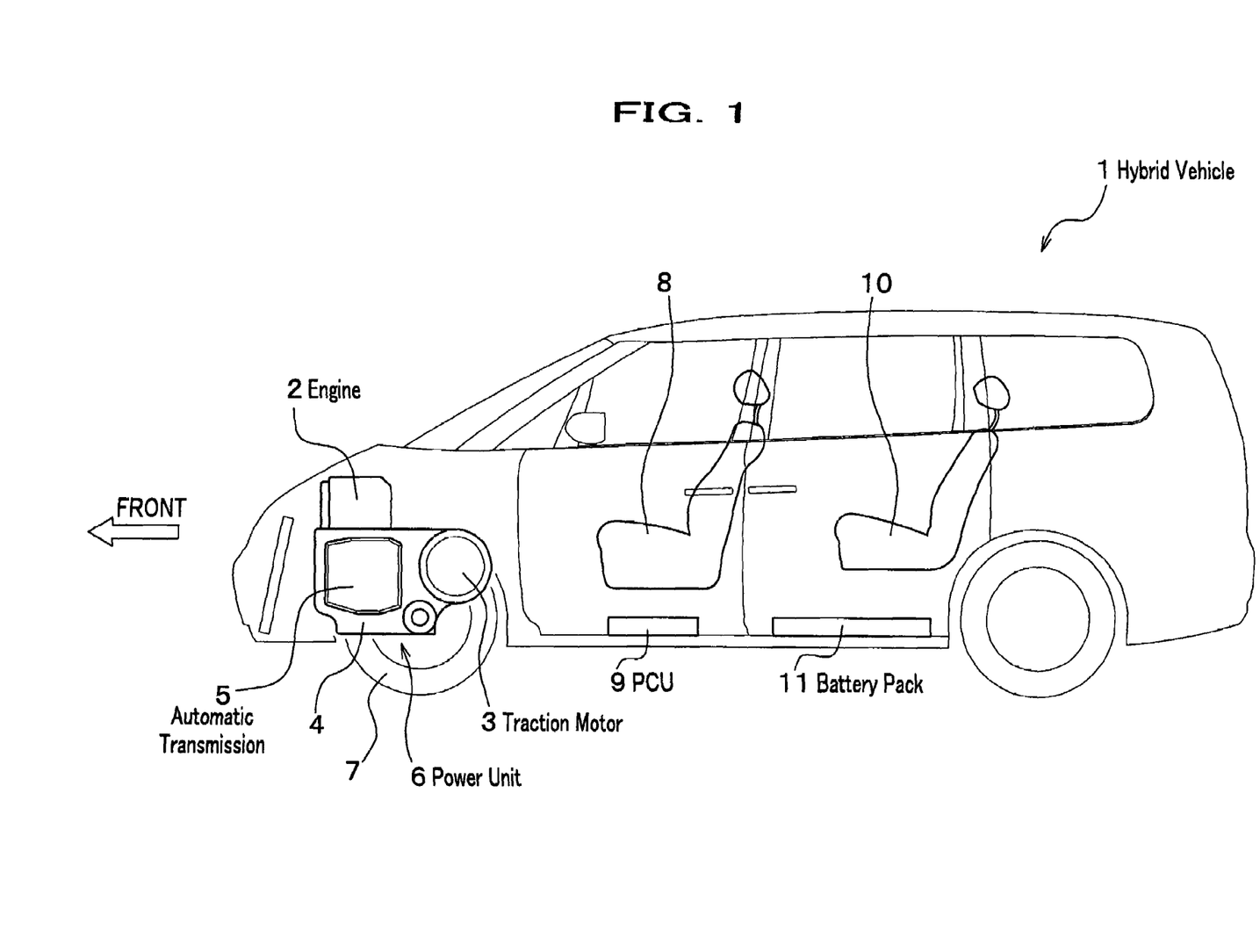
FIG. 1 is a perspective side drawing of a hybrid vehicle where a traction motor related to a first embodiment of the present invention is mounted.

In a hybrid vehicle 1 shown in FIG. 1 an engine 2 of a driving power source (in the embodiment a four-banger gasoline engine) and a traction motor 3 configure a power unit 6 together with an automatic transmission 5 and a drive-force selector 4 that houses a differential, and are horizontally mounted on front wheels, respectively. Beneath a front seat 8 is placed a PCU (Power Control Unit) 9 comprising an inverter, a control circuit, a CPU (Central Processing Unit), and the like: the PCU 9 performs power output control of the engine 2 and the traction motor 3, drive-force distribution control for the drive-force selector 4, and the like. In addition, beneath a rear seat 10 is placed a battery pack 11 charging electric power of a high voltage (for example, 145 volts): the electric power of the battery pack 11 is supplied to the traction motor 3 through the PCU 9.

<Configuration of Traction Motor>

Next will be described a configuration of the traction motor 3 related to the first embodiment, referring FIGS. 2 and 3. As described above, the traction motor 3 is horizontally placed on the hybrid vehicle 1 in a form that a left in FIG. 3 becomes a vehicle front.

Figure 2:
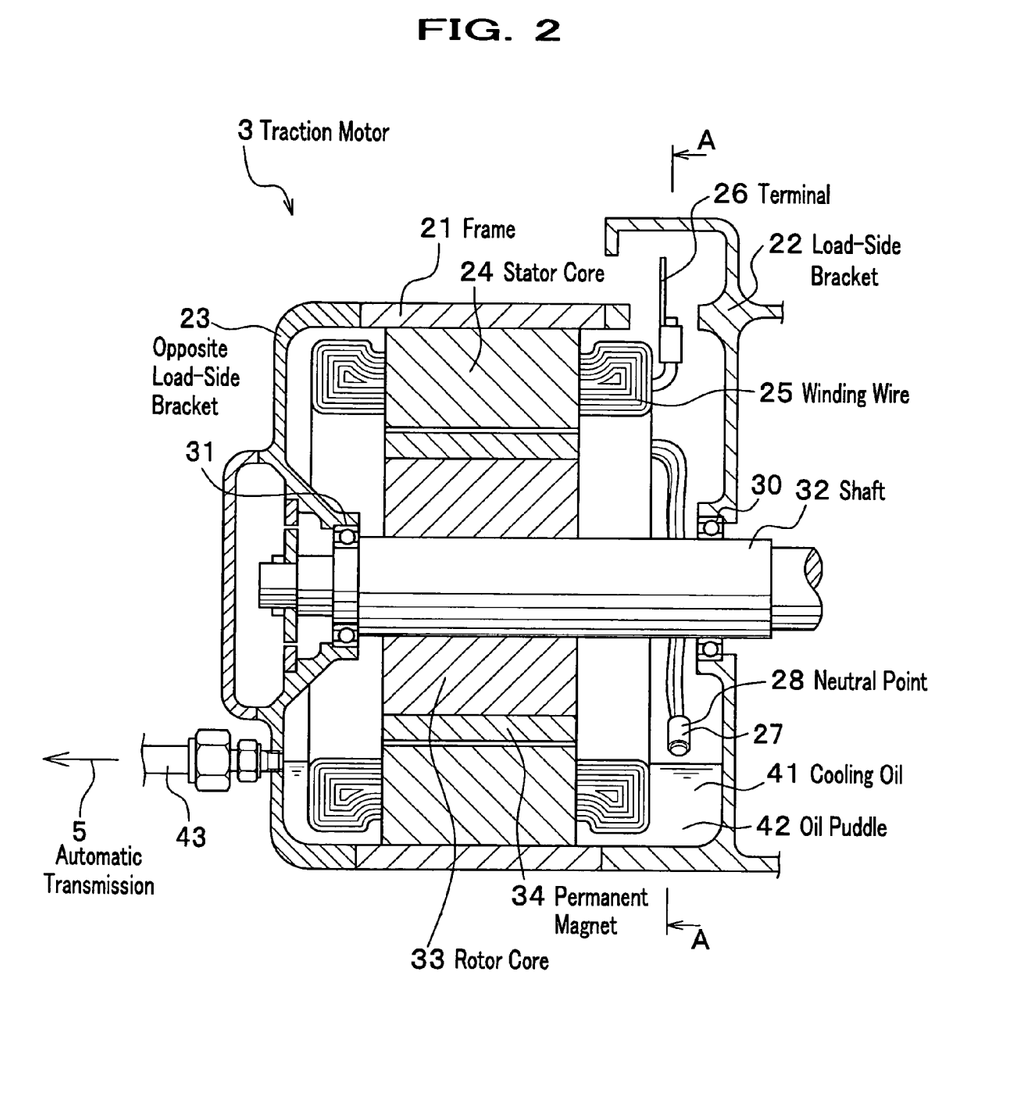
FIG. 2 is a schematic configuration drawing of the traction motor of the first embodiment.

As shown in FIG. 2, the traction motor 3 makes it an outer shell thereof a cylindrical frame 21, a load-side bracket 22 fastened to one end of the frame 21, an opposite load-side bracket 23 fastened to the other end of the frame 21. On an inner circumference face of the frame 21 is fixed a stator core 24 that consists of annular thin steel sheets' being stacked; around the stator core 24 is wound a winding wire 25. As shown in FIG. 3, inside the load-side bracket 22 is upward extended a terminal 26 (26u, 26v, and 26w) connected to one end of three phase winding wires of the winding wire 25; on the other hand, at a lower portion of the winding wire 25 is placed a neutral point 28 that consists of the other end of the each phase winding wire's being bundled and caulked by a harness 27. The neutral point 28 is positioned at a rear portion in the traction motor 3 in a state of its being mounted on the hybrid vehicle 1.

As shown in FIG. 2, to the load-side bracket 22 is attached a bearing 30, on the other hand, to the opposite load-side bracket 23 is attached a bearing 31, and a shaft 32 of a rotation shaft of the traction motor 3 is rotation-free supported by the bearings 30 and 31. Around the shaft 32 is fitted and fixed a rotor core 33 that consists of annular thin steel sheets' being stacked, and at an outer circumference side are supported a plurality of permanent magnets 34.

Figure 3:
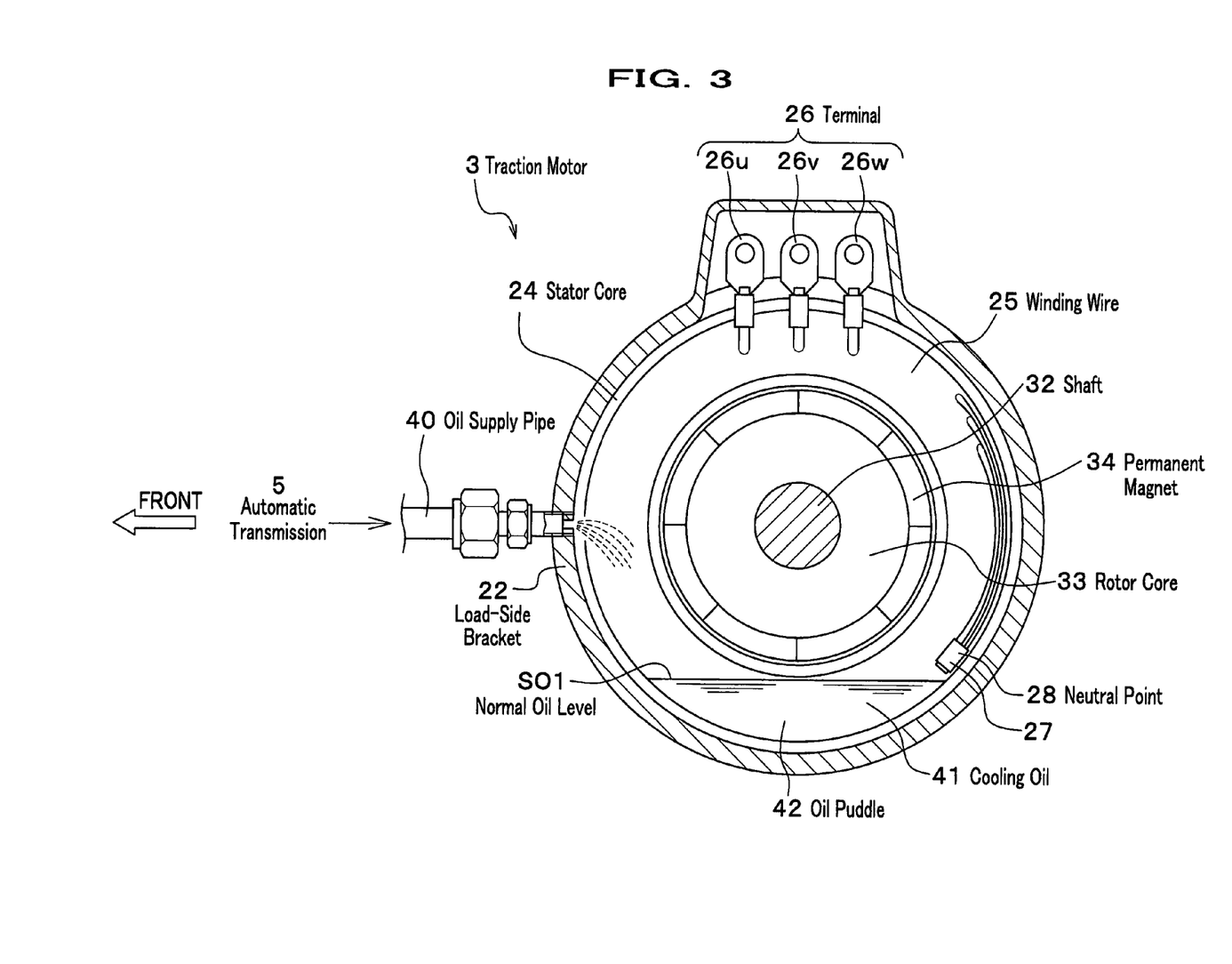
FIG. 3 is an A—A section drawing in FIG. 2.

As shown in FIG. 3, to a side of the load-side bracket 22 for an axial direction of the shaft 32 is connected an oil supply pipe 40, and therethrough inside the traction motor 3 is supplied ATF (Automatic Transmission Fluid) of a hydraulic circuit (not shown) of the automatic transmission 5. At a lower portion of an inside space of the traction motor 3 is formed an oil puddle 42 for reserving the ATF supplied from the oil supply pipe 40 as a cooling oil 41. In addition, as shown in FIG. 2, at a lower portion of an end face of the opposite load-side bracket 23 is connected an oil discharge pipe 43, and therethrough the cooling oil 41 inside the oil puddle 42 refluxes in the hydraulic circuit of the automatic transmission 5. In the embodiment the neutral point 28 is positioned directly above an oil level (normal oil level S01)

of the oil puddle 42 in a state of the hybrid vehicle 1 (see FIG. 1) stopping on a flat road.

<Action of the First Embodiment>

Here will be described an action of the first embodiment.

When the hybrid vehicle 1 of the embodiment starts a drive, the PCU 9 performs drive-force distribution control. In other words, the PCU 9 separately uses a power force of the engine 2 and that of the traction motor 3 in various distributions according to a driving situation. For example, in a start only the power force of the traction motor 3 is used, and a smooth starting acceleration is performed by a larger low-speed torque. In addition, at a constant drive including a high-speed cruise the power force of the engine 2 is mainly used, and an improvement of a fuel consumption is realized. In addition, in an acceleration drive and a hill climb drive are used both of the power forces of the engine 2 and the traction motor 3, and a comfortable drive is realized by a larger drive torque. In addition, in a deceleration drive the traction motor 3 is used as a generator (regenerative brake), and the battery pack 11 is charged by generated electric power. And in a stop due to a traffic signal and the like are stopped both of the engine 2 and the traction motor 3, and thereby wasteful fuel and power consumptions are done away with.

When the hybrid vehicle 1 drives at a high load such as an acceleration drive and a hill climb drive, a larger current flows in the traction motor 3 of the hybrid vehicle 1, accompanying an increase of a generation power output, and a larger amount of heat is generated at the neutral point 28 where a current of each phase concentrates. In addition, when the hybrid vehicle 1 cruises at a high speed where the power force of the engine 2 is mainly used, the heat generation at the neutral point 28 becomes less; whereas the temperature of the ATF rises at the automatic transmission 5 due to a gear engagement speed and the like. In the embodiment, because the oil puddle 42 and neutral point 28 of the traction motor 3 are made such a positional relationship described above, the neutral point 28 is enabled to be effectively cooled as described later.

Figure 4:
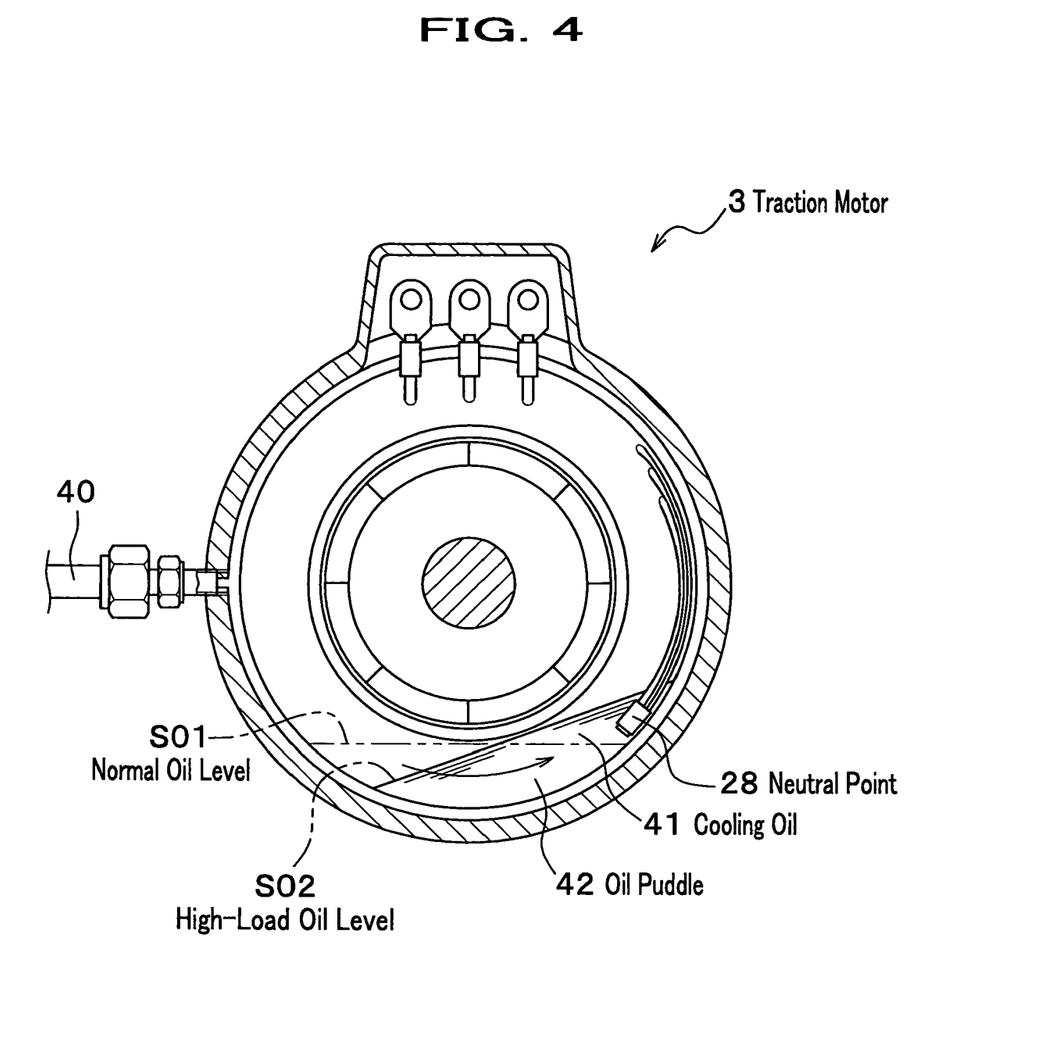
FIG. 4 is a section drawing of a traction motor in an acceleration drive.

In FIG. 4 is shown a section of the traction motor 3 in an acceleration drive, and as proved therein: the cooling oil 41 reserved in the oil puddle 42 becomes in a rear direction by inertia in the acceleration drive, an oil level thereof tilts from the normal oil level SO1 (shown in a chain double-dashed line), and thus changes to a high-load oil level SO2. Thus the neutral point 28 results in being immersed in the cooling oil 41 of the oil puddle 42, the heat described above is deprived of the cooling oil 41, and an overheat thereof is prevented.

Figure 5:
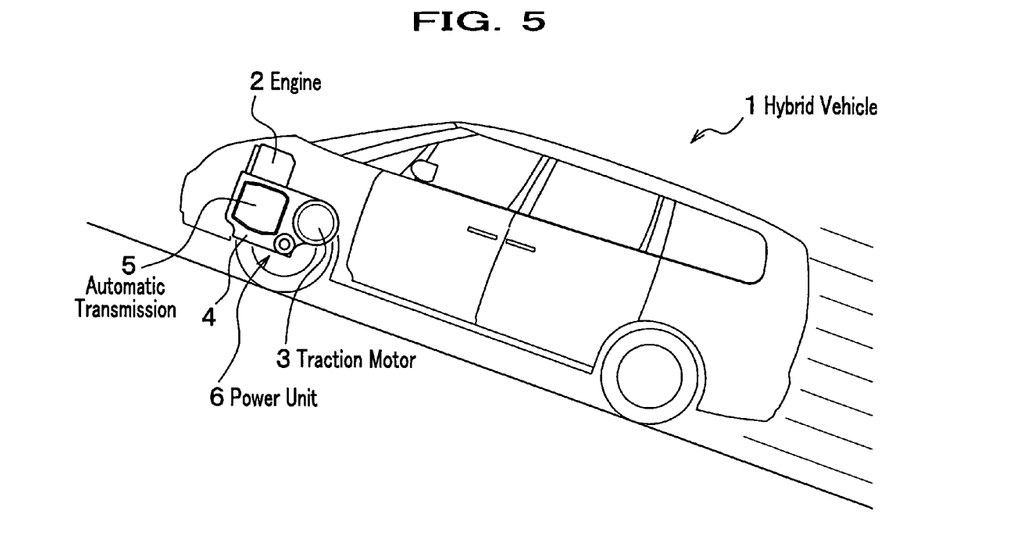
FIG. 5 is a drawing showing a state that a hybrid vehicle performs a hill climb drive.
Figure 6:
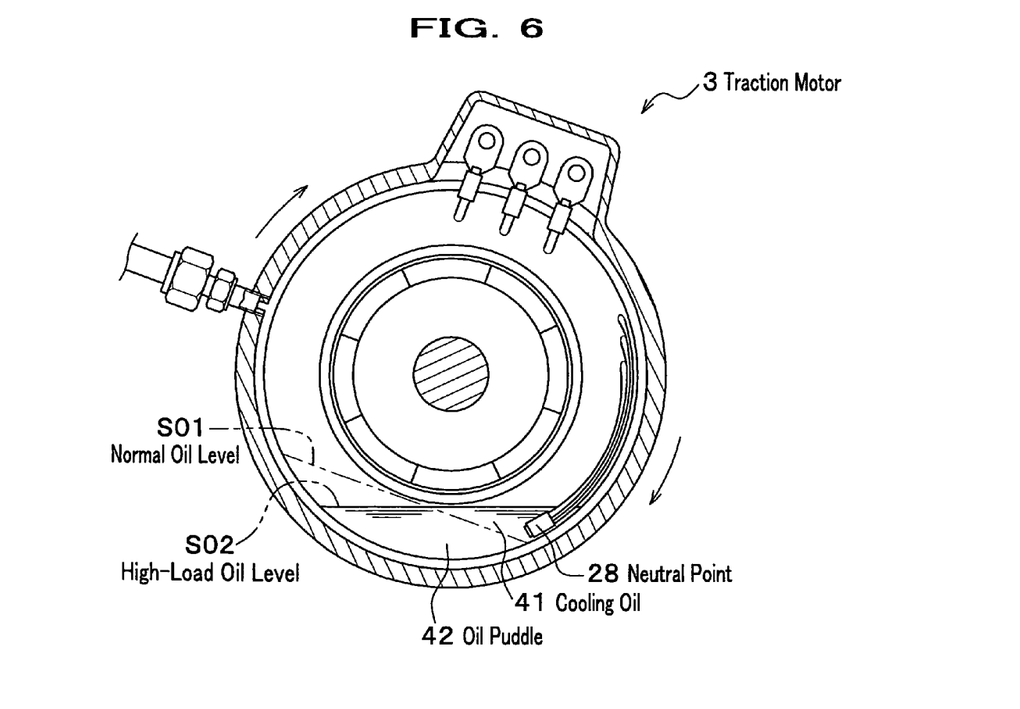
FIG. 6 is a section drawing of a traction motor in a hill climb drive.

In FIG. 5 is shown a state of the hybrid vehicle 1 performing a hill climb drive; in FIG. 6 is shown a section of the traction motor 3 in the hill climb drive. As proved in FIGS. 5 and 6, because when the hybrid vehicle 1 performs the hill climb drive and the vehicle body tilts rearward, the traction motor 3 of the power unit 6 becomes a form of swinging clockwise, making the shaft 32 an axis thereof, an oil level of the oil puddle 42 relatively changes from the normal oil level SO1 (shown in a chain double-dashed line) to the high-load oil level SO2. Thus, same as in the acceleration drive, the neutral point 28 results in being immersed in the cooling oil 41 in the oil puddle 42, and the heat described above is deprived of the cooling oil 41, and an overheat thereof is prevented.

On the other hand, because when the hybrid vehicle 1 cruises at a high speed, the power force of the engine 2 is mainly used as a driving power force, a heat generation at the neutral point 28 becomes less; whereas the temperature of the ATF rises at the automatic transmission 5 due to a gear engagement speed and the like. However, because in the embodiment an oil level of the oil puddle 42 remains as the normal oil level SO1 is, as shown in FIG. 3, the neutral point 28 is not immersed in the cooling oil 41 of the oil puddle 42, and thus it is not overheated by a high temperature of the cooling oil 41.

In the first embodiment, because such the configuration is adopted, the neutral point 28 of the traction motor 3 can result in being effectively cooled notwithstanding the configuration's being comparatively convenient and lower cost.

Second Embodiment

Next will be described a second embodiment, referring to FIGS. 7 and 8.

The second embodiment adopts a configuration of directly injecting the cooling oil 41 at the neutral point 28 in an acceleration drive and a hill climb drive. In the second embodiment, because a total configuration thereof is similar to that of the first embodiment, a configuration and action thereof will be described for a different point only therefrom.

<Configuration of Hybrid Vehicle>

Figure 7:
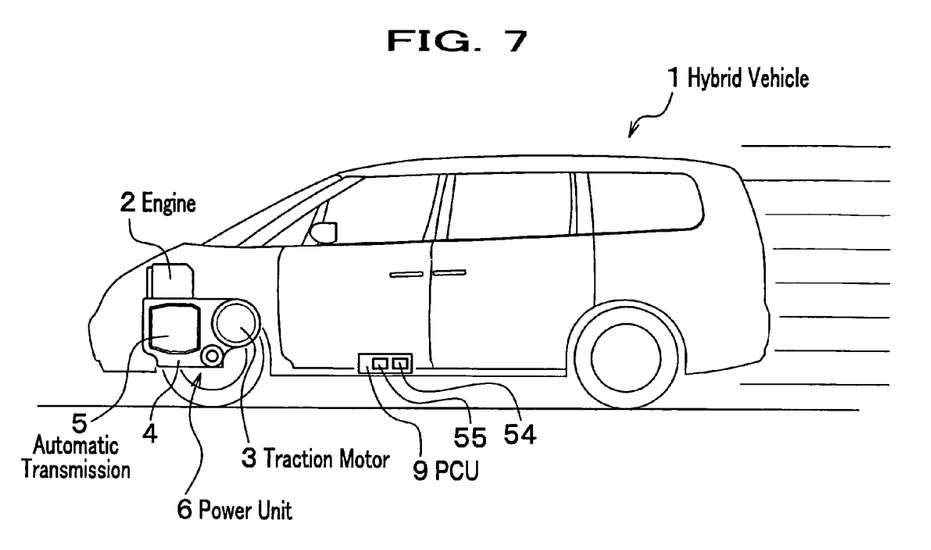
FIG. 7 is a perspective side drawing of a hybrid vehicle where a traction motor related to a second embodiment of the present invention is mounted.

As shown in FIG. 7, although the hybrid vehicle 1 of the second embodiment adopts a configuration substantially similar to that of the first embodiment, an acceleration sensor 54 and a tilt sensor 55 are placed in a vicinity of the PCU 9 as a high-load detection mechanism. The acceleration sensor 54 and the tilt sensor 55 detect an acceleration of the hybrid vehicle 1 and a tilt of the vehicle body, and are electrically connected to the PCU 9.

<Configuration of Traction Motor>

Figure 8:
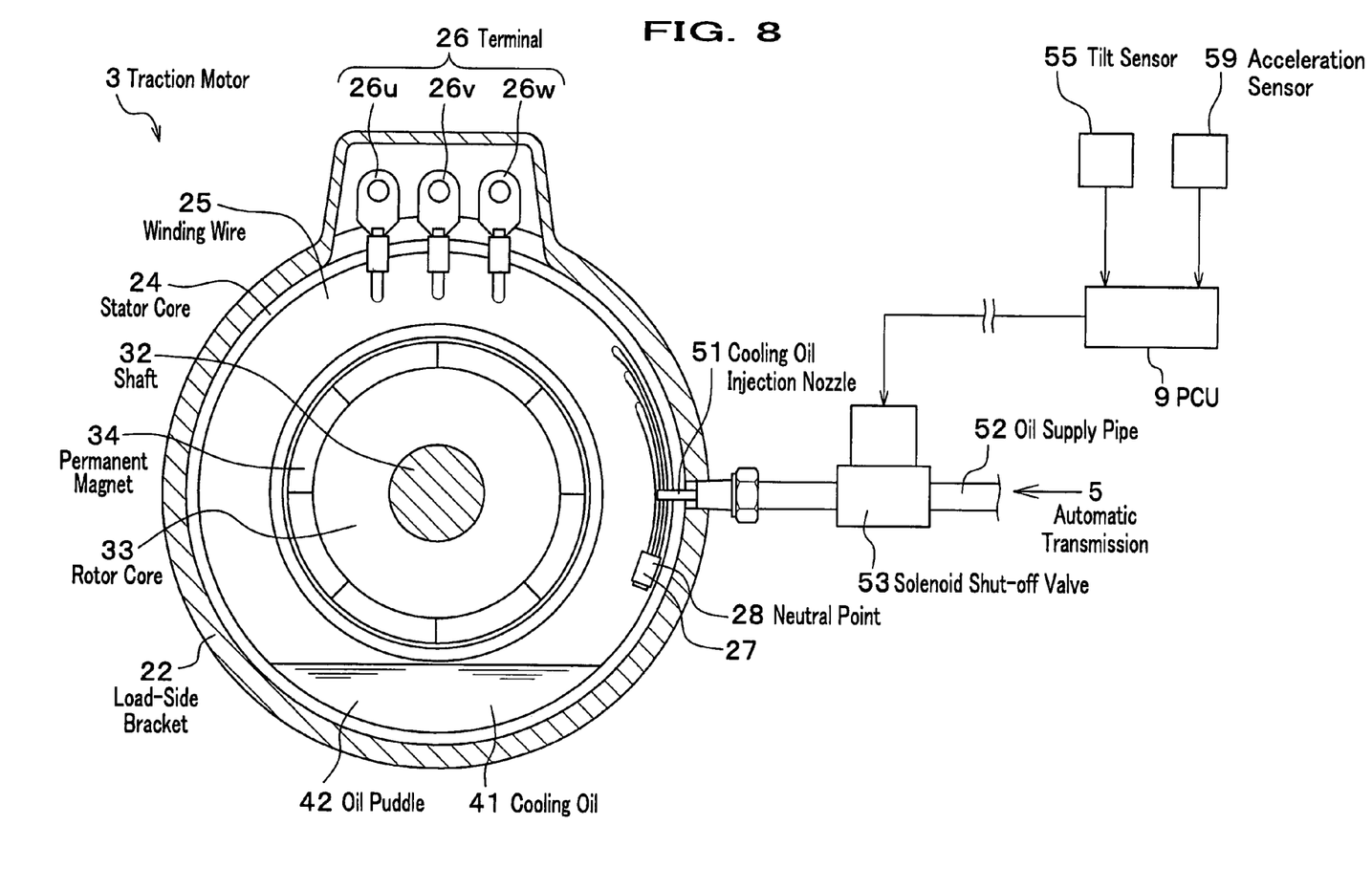
FIG. 8 is a schematic configuration drawing of the traction motor of the second embodiment.

As shown in FIG. 8, in the traction motor 3 of the second embodiment the neutral point 28 is placed upper than that of the first embodiment, and a cooling oil injection nozzle 51 is provided at an upper portion than the neutral point 28. The cooling oil injection nozzle 51 is attached in a form of penetrating through a side of the load-side bracket 22 for an axial direction of the shaft 32, and an oil connection pipe 52 is connected for supplying the ATF from a hydraulic circuit (not shown) of the automatic transmission 5.

In between the oil connection pipe 52 is equipped a solenoid shut-off valve 53 for communicating and shutting off a pipe passage thereof. Although the solenoid shut-off valve 53 is designed to be normally a valve close (shut-off) state, it becomes an open (communication) state by an excitation current's from the PCU 9 being input.

<Action of the Second Embodiment>

Here will be described an action of the second embodiment.

Figure 9:
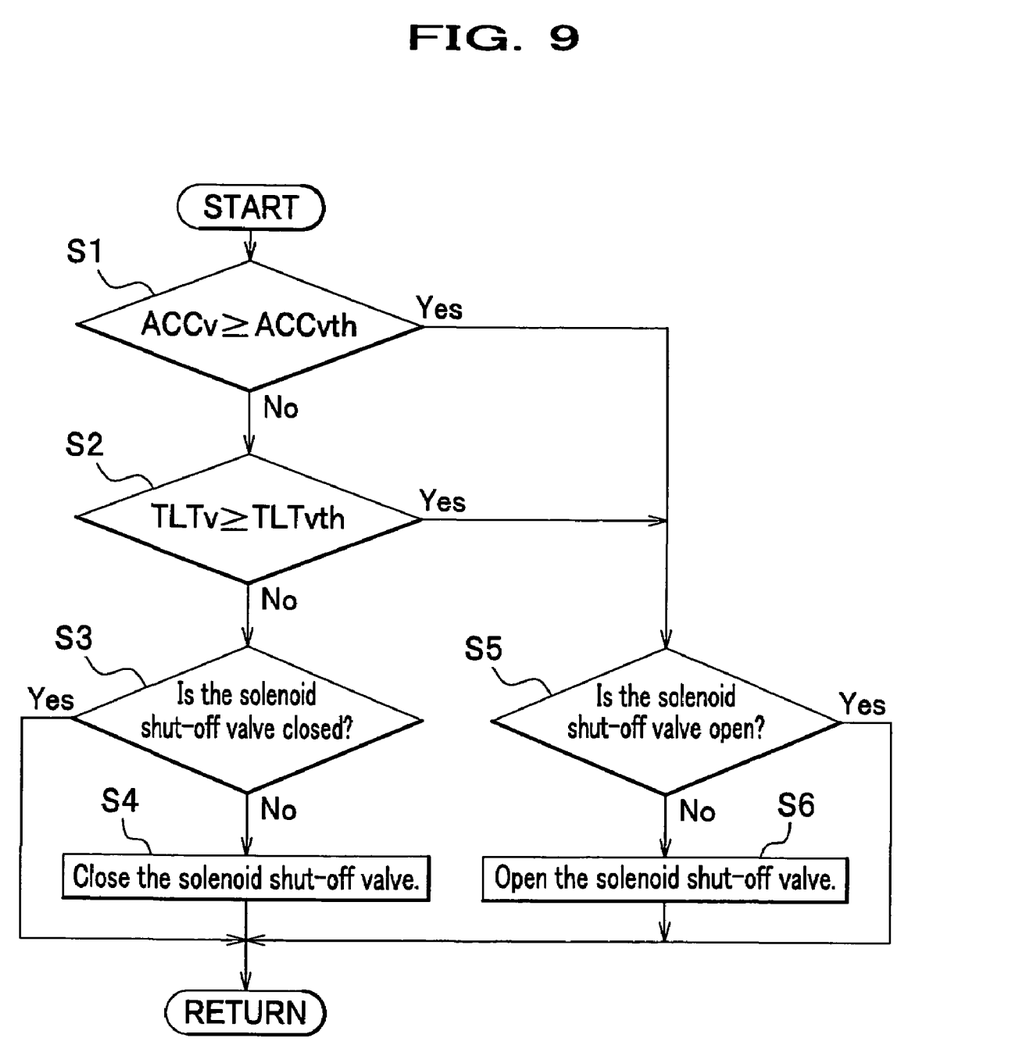
FIG. 9 is a flowchart showing a procedure of motor cooling control in the second embodiment.

In a drive of the hybrid vehicle 1 the PCU 9 repeatedly executes motor cooling control of which processing flow is shown in a flowchart of FIG. 9. Starting the motor cooling control, the PCU 9 firstly determines in a step S1 whether or not an acceleration ACCv detected by the acceleration sensor 54 is not less than a cooling start acceleration ACCvth (for example, 0.4 G): if a determination thereof is No, the PCU 9 determines in a step S2 whether or not a rear tilt angle TLTv of the vehicle body detected by the tilt sensor 55 is not less than a cooling start rear tilt angle TLTvth (for example, 15 degrees).

For example, if the hybrid vehicle 1 drives on a flat road at a constant speed and the determination of the step S2 also is No, the PCU 9 further determines in a step S3 whether or not the solenoid shut-off valve 53 is in a valve close state.

And if the determination of the step S3 is Yes, the PCU 9 returns to the start without executing any processing and repeats the motor cooling control; if the determination of the step S3 is No, the PCU 9 closes the solenoid shut-off valve 53 in a step S4. Thus the pipe passage of the oil supply pipe 52 is shut off, a temperature rise of the neutral point 28 due to an injection of the cooling oil 41 is prevented also when the hybrid vehicle 1 drives at a high-speed and the ATF of the automatic transmission 5 becomes a higher temperature.

Figure 10:
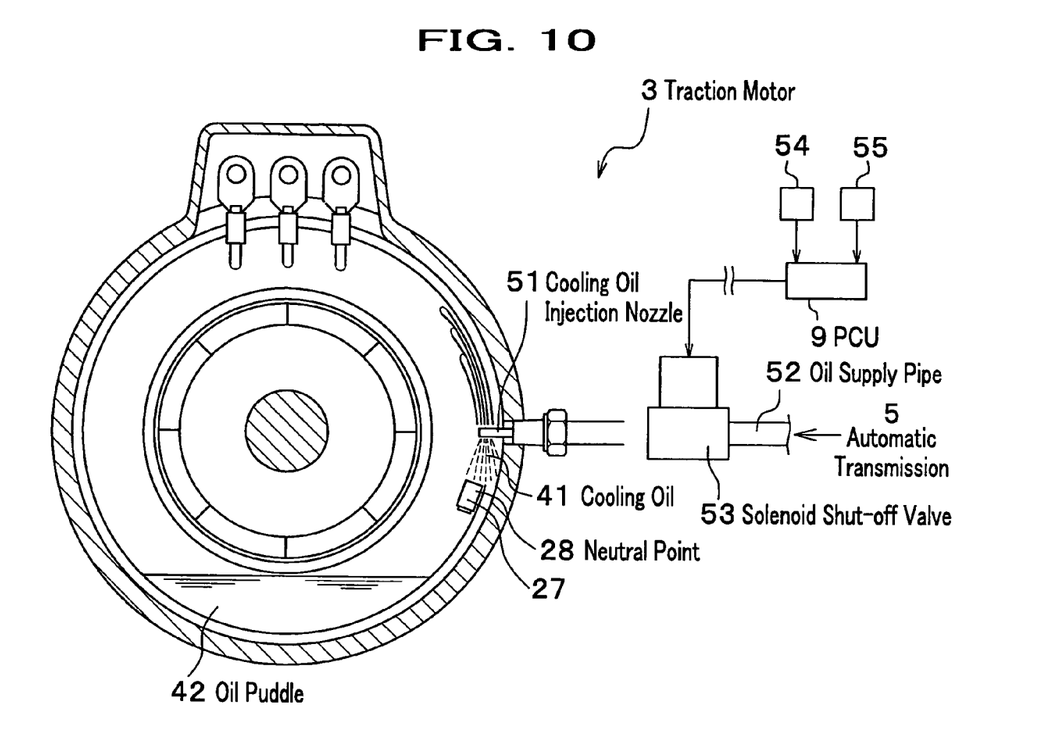
FIG. 10 is a section drawing of a traction motor in an acceleration drive.

On the other hand, if the hybrid vehicle 1 performs an acceleration drive and the determination of the step S1 is Yes, or if the hybrid vehicle 1 performs a hill climb drive and the determination of the step S2 is Yes, the PCU 9 further determines in a step S5 whether or not the solenoid shut-off valve 53 is in a valve open state. And if the determination of the step S5 is Yes, the PCU 9 returns to the start without executing any processing and repeats the motor cooling control; if the determination of the step S5 is No, the PCU 9 opens the solenoid shut-off valve 53 in a step S6. Thus, as shown in FIG. 10, the pipe passage of the oil supply pipe 52 is communicated, the cooling oil 41 is injected at the neutral point 28, and it is rapidly cooled by the cooling oil 41 of a comparatively low temperature: thus an overheat of the neutral point 28 is prevented also when the hybrid vehicle 1 drives at a high load and a large amount of heat is generated at the neutral point 28 of the traction motor 3.

In the second embodiment, because the neutral point 28 is directly cooled by the cooling oil 41 (ATF) from the automatic transmission 5, a higher cooling effect can be obtained than in the first embodiment where the neutral point 28 is immersed in the oil puddle 42.

Third Embodiment

A third embodiment adopts a configuration of directly injecting the cooling oil 41 at the neutral point 28 in a temperature rise of the traction motor 3. Also in the third embodiment, because a total configuration thereof is similar to that of the first embodiment, a configuration and action thereof will be described for a different point only therefrom.

<Configuration of Traction Motor>

Figure 11:
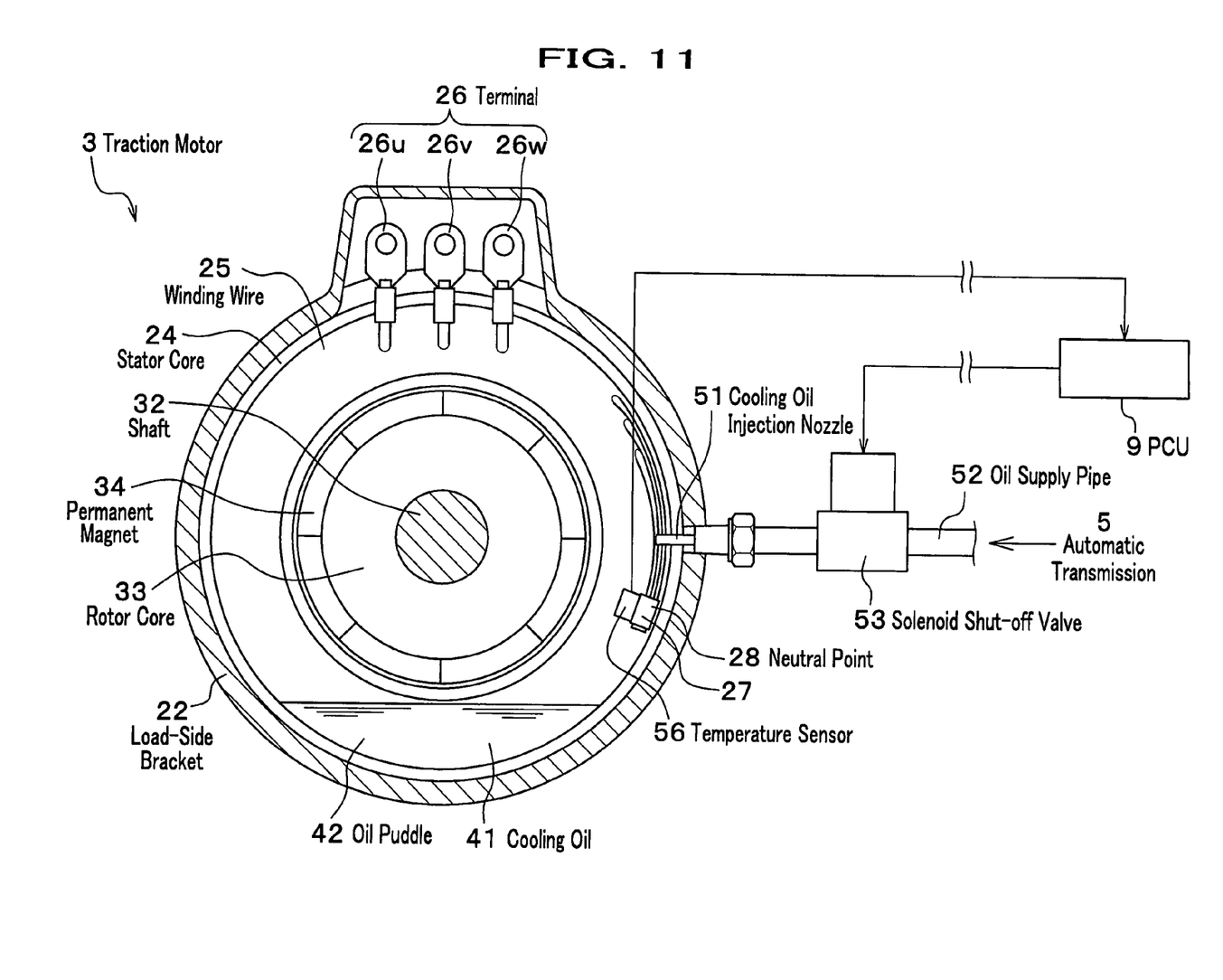
FIG. 11 is a schematic configuration drawing of a traction motor of a third embodiment of the present invention.

As shown in FIG. 11, in the traction motor 3 of the third embodiment the neutral point 28 is placed upper than that of the first embodiment same as the second embodiment, and the cooling oil injection nozzle 51 is provided at an upper portion than the neutral point 28. In addition, the cooling oil injection nozzle 51 is attached in a form of penetrating through a side of the load-side bracket 22 for an axial direction of the shaft 32, and the oil connection pipe 52 is connected for supplying the ATF from a hydraulic circuit (not shown) of the automatic transmission 5.

In between the oil connection pipe 52 is equipped the solenoid shut-off valve 53 for communicating and shutting off a pipe passage thereof. Although the solenoid shut-off valve 53 is designed to be normally a valve close (shut-off) state, it becomes an open (communication) state by an excitation current's from the PCU 9 being input. To the PCU 9 is connected a temperature sensor 56 as a high-load detection mechanism. The temperature sensor 56 detects a temperature of the neutral point 28 of the traction motor 3 and is placed in a form of contacting the harness 27.

<Action of the Third Embodiment>

Here will be described an action of the third embodiment.

Figure 12:
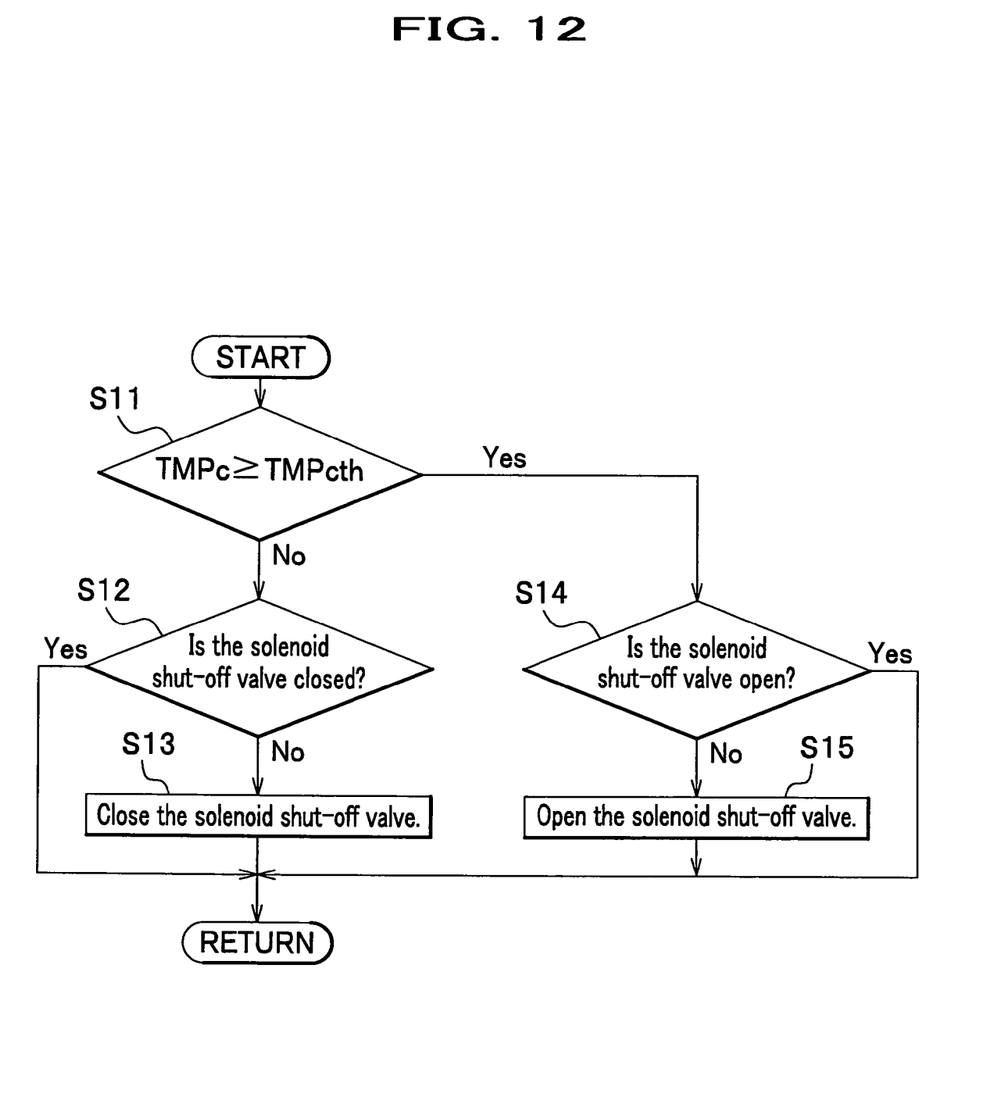
FIG. 12 is a flowchart showing a procedure of motor cooling control in the third embodiment.

In a drive of the hybrid vehicle 1 the PCU 9 repeatedly executes motor cooling control of which processing flow is shown in a flowchart of FIG. 12. Starting the motor cooling control, the PCU 9 firstly determines in a step S11 whether or not a neutral point temperature TMPc detected by the temperature sensor 56 is not less than a cooling start temperature TMPcth (for example, 120 degrees Celsius): if a determination thereof is No, the PCU 9 determines in a step S12 whether or not the solenoid shut-off valve 53 is in a valve close state. And if the determination of the step S12 is Yes, the PCU 9 returns to the start without executing any processing and repeats the motor cooling control; if the determination of the step S12 is No, the PCU 9 closes the solenoid shut-off valve 53 in a step S13. Thus the pipe passage of the oil supply pipe 52 is shut off, a temperature rise of the neutral point 28 due to an injection of the cooling oil 41 is prevented also when the hybrid vehicle 1 drives at a high-speed and the ATF of the automatic transmission 5 becomes a higher temperature.

Figure 13:
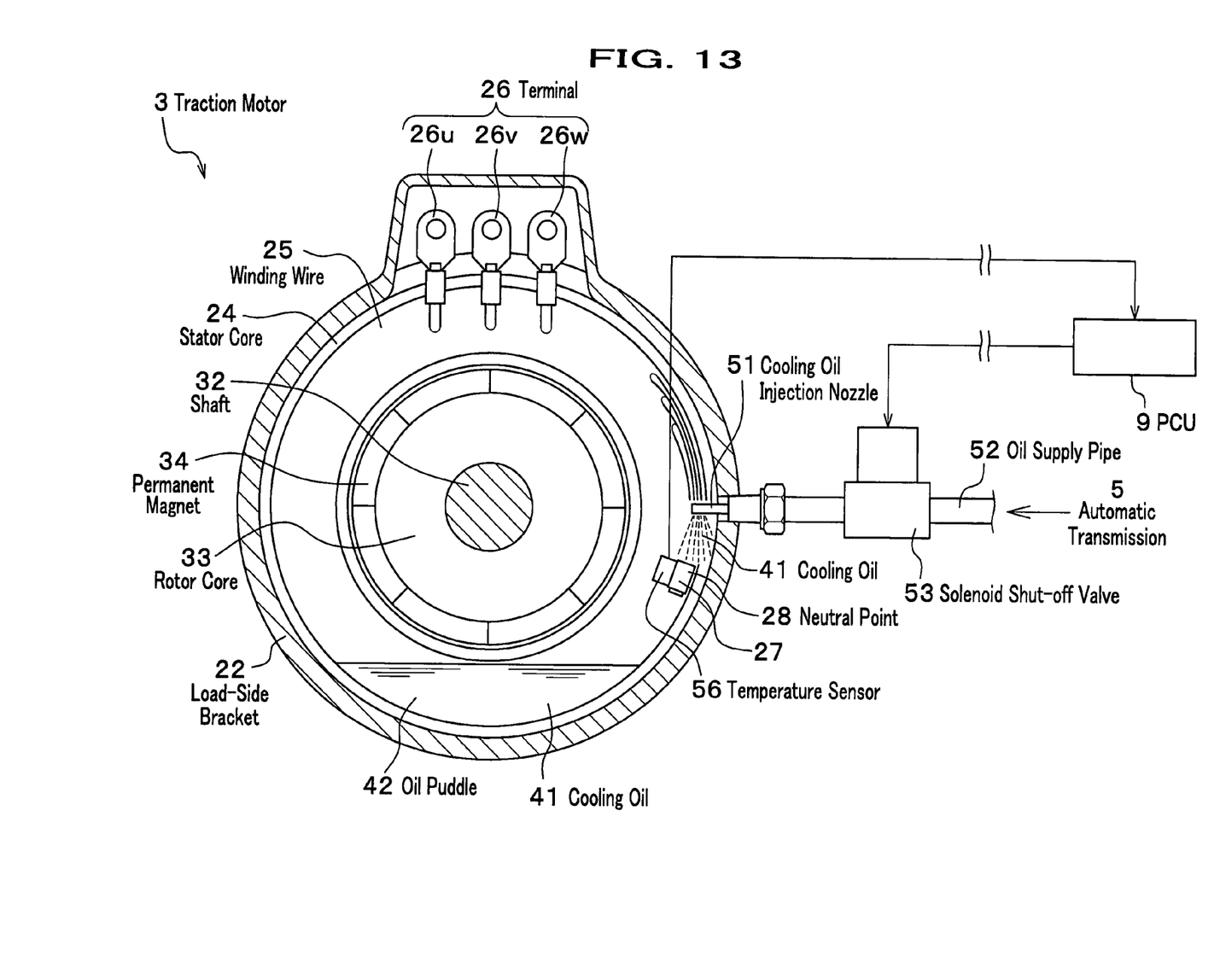
FIG. 13 is a section drawing of a traction motor in a temperature rise of a neutral point.

On the other hand, if the hybrid vehicle 1 drives at a high load, the neutral point temperature TMPc rises, and the determination of the step S11 becomes Yes, the PCU 9 further determines in a step S14 whether or not the solenoid shut-off valve 53 is in a valve open state. And if the determination of the step S14 is Yes, the PCU 9 returns to the start without executing any processing and repeats the motor cooling control; if the determination of the step S14 is No, the PCU 9 opens the solenoid shut-off valve 53 in a step S15. Thus, as shown in FIG. 13, the pipe passage of the oil supply pipe 52 is communicated, the cooling oil 41 is injected at the neutral point 28, and it is rapidly cooled by the cooling oil 41 of a comparatively low temperature: thus an overheat of the neutral point 28 is prevented also when the hybrid vehicle 1 drives at a high load and a large amount of heat is generated at the neutral point 28 of the traction motor 3.

In the third embodiment, because the neutral point 28 is directly cooled by the cooling oil 41 (ATF) from the automatic transmission 5, a higher cooling effect can be obtained than in the first embodiment where the neutral point 28 is immersed in the oil puddle 42. In addition, an injection of the cooling oil 41 is designed to be performed, based on an actual temperature of the neutral point 28, an over heat of the neutral point 28 can be more surely suppressed.

The present invention can be widely variably embodied without being limited by the embodiments. Although each of the embodiments is applied to a traction motor of a hybrid vehicle, it can also be applied to an electric vehicle and a fuel cell vehicle. In addition, in each of the embodiments, although an automatic transmission is adopted as driving-related equipment of a supply source of cooling oil, such an engine and an electric pump power steering may also be adopted. In addition, the second and third embodiments may comprise a valve at an oil discharge pipe, close the valve in a high-load driving state only, thereby rise an oil level of cooling oil, and thus increase a contact amount of an oil supply amount to a neutral point. In addition, the second embodiment places an acceleration sensor and a tilt sensor at a vehicle body of a hybrid vehicle: although when at least one of an acceleration and a tilt angle becomes not less than predetermined values, an injection of cooling oil at a neutral point is designed to be performed with opening a solenoid shut-off valve, either an acceleration sensor or a tilt sensor may be placed, or else a valve opening amount may be increased with using a motor valve and the like as the acceleration and the tilt angle become larger. In addition, the third embodiment may be designed to also detect a temperature of the ATF supplied from an automatic transmission, and only when the temperature of the ATF is higher than a predetermined temperature and lower than a temperature of a neutral point, to inject cooling oil at the neutral point. In addition, although the third embodiment is designed to inject cooling oil at the neutral point based on a temperature thereof, it may be performed based on temperatures of an outer wall and oil puddle of a traction motor. In addition, the second and third embodiments may be designed to adopt a motorized hydraulic pump and to supply cooling oil to a neutral point from an oil pan and the like of driving-related equipment. In addition to these examples, the structure of the motor can modified in many ways not departing from the spirit of the invention.

What is claimed is:

1. A motor cooling system for cooling a three-phase alternating current motor mounted on a vehicle as a traction motor where oil is introduced as cooling oil from driving-related equipment of said vehicle,
    wherein said traction motor comprises a stator having a neutral point,
    wherein said vehicle is in a high-load driving state when a larger load is applied to said traction motor than a predetermined amount,
    wherein, when said vehicle is in the high-load driving state, said neutral point contacts said cooling oil with a larger contact amount than when said vehicle is not in said high-load driving state;
    said system comprising an oil puddle having an oil level that changes from a normal oil level to a high-load oil level when said vehicle transits from not the high-load driving state to the high-load driving state,
    wherein at least a part of said neutral point is positioned between said normal oil level and said high-load oil level.

2. A motor cooling system for cooling a three-phase alternating current motor mounted on a vehicle as a traction motor where oil is introduced as cooling oil from driving-related equipment of said vehicle,
    wherein said traction motor comprises a stator having a neutral point,
    wherein said vehicle is in a high-load driving state when a larger load is applied to said traction motor than a predetermined amount,
    wherein, when said vehicle is in the high-load driving state, said neutral point contacts said cooling oil with a larger contact amount than when said vehicle is not in said high-load driving state;
    said system comprising an oil supply mechanism for supplying oil from said driving-related equipment to said neutral point;
    a high-load detection mechanism for detecting whether or not said vehicle is in a high-load driving state, wherein said high-load detection mechanism detects that said vehicle is in a high-load driving state when an acceleration of the vehicle becomes not less than a predetermined value in a driving state; and
    an oil supply amount control mechanism for increasing an oil supply amount to said neutral point by said oil supply mechanism when said vehicle is detected to be in a high-load driving state by said high-load detection mechanism.

3. A motor cooling system for cooling a three-phase alternating current motor mounted on a vehicle as a traction motor where oil is introduced as cooling oil from driving-related equipment of said vehicle,
    wherein said traction motor comprises a stator having a neutral point,
    wherein said vehicle is in a high-load driving state when a larger load is applied to said traction motor than a predetermined amount,
    wherein, when said vehicle is in the high-load driving state, said neutral point contacts said cooling oil with a larger contact amount than when said vehicle is not in said high-load driving state;
    said system comprising an oil supply mechanism for supplying oil from said driving-related equipment to said neutral point;
    a high-load detection mechanism for detecting whether or not said vehicle is in a high-load driving state, wherein said high-load detection mechanism detects that said vehicle is in a high-load driving state when the vehicle tilts rearward by not less than a predetermined angle; and
    an oil supply amount control mechanism for increasing an oil supply amount to said neutral point by said oil supply mechanism when said vehicle is detected to be in a high-load driving state by said high-load detection mechanism.

4. A motor cooling system for cooling a three-phase alternating current motor mounted on a vehicle as a traction motor where oil is introduced as cooling oil from driving-related equipment of said vehicle,
    wherein said traction motor comprises a stator having a neutral point,
    wherein said vehicle is in a high-load driving state when a larger load is applied to said traction motor than a predetermined amount,
    wherein, when said vehicle is in the high-load driving state, said neutral point contacts said cooling oil with a larger contact amount than when said vehicle is not in said high-load driving state;
    said system comprising an oil supply mechanism for supplying oil from said driving-related equipment to said neutral point;
    a high-load detection mechanism for detecting whether or not said vehicle is in a high-load driving state, wherein said high-load detection mechanism detects that said vehicle is in a high-load driving state when said traction motor becomes not less than a predetermined temperature; and
    an oil supply amount control mechanism for increasing an oil supply amount to said neutral point by said oil supply mechanism when said vehicle is detected to be in a high-load driving state by said high-load detection mechanism.

* * * * *